May 29, 1956 H. A. GATTUSO 2,747,502

SCREEN PRINTERS

Filed Jan. 21, 1953 5 Sheets-Sheet 1

INVENTOR
Henry A. Gattuso,

BY J. Richard Paris.
ATTORNEY

May 29, 1956 H. A. GATTUSO 2,747,502

SCREEN PRINTERS

Filed Jan. 21, 1953 5 Sheets-Sheet 2

INVENTOR

Henry A. Gattuso,

BY J. Richard Paris

ATTORNEY

May 29, 1956 H. A. GATTUSO 2,747,502

SCREEN PRINTERS

Filed Jan. 21, 1953 5 Sheets-Sheet 3

INVENTOR

Henry A. Gattuso,

BY J. Richard Paris

ATTORNEY

May 29, 1956 H. A. GATTUSO 2,747,502

SCREEN PRINTERS

Filed Jan. 21, 1953 5 Sheets-Sheet 4

INVENTOR

Henry A. Gattuso,

BY [signature]

ATTORNEY

INVENTOR

Henry A. Gattuso,

BY J. Richard Paris

ATTORNEY

United States Patent Office 2,747,502

Patented May 29, 1956

2,747,502

SCREEN PRINTERS

Henry A. Gattuso, Adams, Mass.

Application January 21, 1953, Serial No. 332,325

8 Claims. (Cl. 101—126)

The present invention relates generally to a screen printing apparatus and is more particularly directed to such apparatus when employed in the production of printed circuits on small carriers or to coating limited areas on such carriers to be employed as condenser elements or in printing resistance elements thereon. In these types of printings the dimensions of the coatings or deposits of conductive ink or paste have to be within certain narrow limits. In condenser elements the coated area needs to be located with a high degree of accuracy with reference to the edges of the carrier and its area has to be accurate. In the printing of resistances the area and thickness of the deposit need to be accurately controlled.

It is therefore the general aim of the present invention to provide a screen printing machine which permits for the accurate control of the coating or deposit of conductive material and to permit for the uniformity of the product once the machine is set or adjusted for the desired results.

The carriers of printed circuits or the condenser elements are of relatively small dimensions. Thus a common element employed in the assembly of condensers is a thin mica sheet about one inch and a quarter by one inch. Thin ceramic elements of about the same dimensions are employed for carrying printed resistances. The present invention is particularly designed for operation upon such elements. It will be understood however that the principles of the present invention are applicable to other such printing operations where accuracy and quantity production are desired.

One of the objects of the present invention is therefore to provide feed means which effect accurate location of the work on the platen. Another object is to coordinate suction means that become effective upon the completion of the feeding operation to hold the work firmly on the platen until after the printing operation is completed. Still another object is to provide a stainless steel wire screen and screen frame in which the screen is drawn taut across the frame and combines substantial rigidity with the desired resilience that permits for the accurate control of the dimensions of the deposited material through the screen onto the work.

Another object is to provide a vertically reciprocable platen with a micrometric control of the vertical movement of the platen thereby controlling the thickness of deposited material through the control of the contact pressure between the work and the screen.

A still further object of the invention is to provide a motor drive screen printing machine in which replaceable or adjustable cams are employed for providing the described coordinated operation and timing of the spreader, the platen, the suction, the work feeder, the work ejector, the work receiver and the transfer of the work from the platen to the work receiver.

Other objects and advantages of the present invention and of the present machine will be apparent to persons skilled in the art from the following specification and the accompanying drawings in which.

Figure 1:
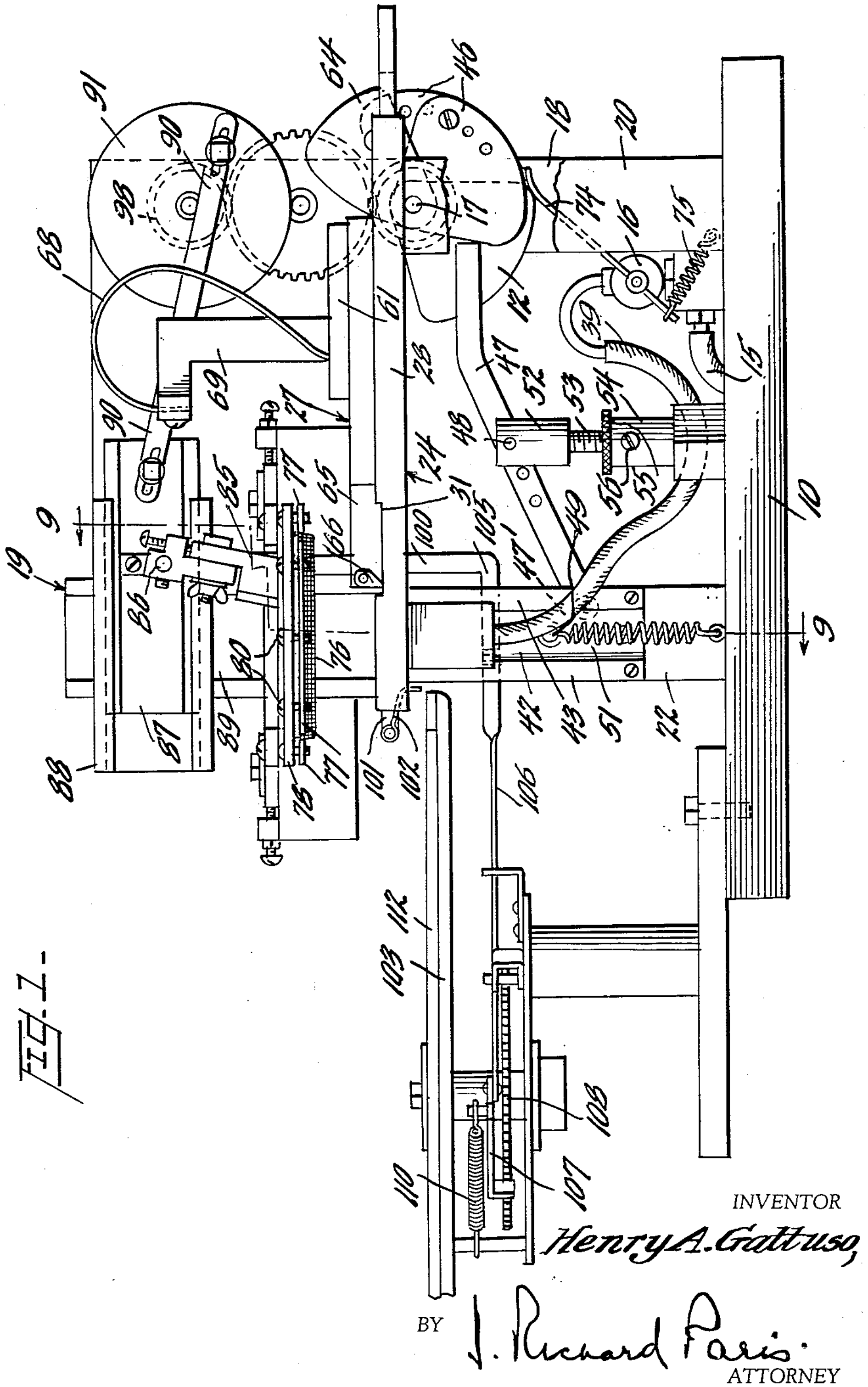
Fig. 1 is a front view of the machine.
Figures 2, 6, 7:
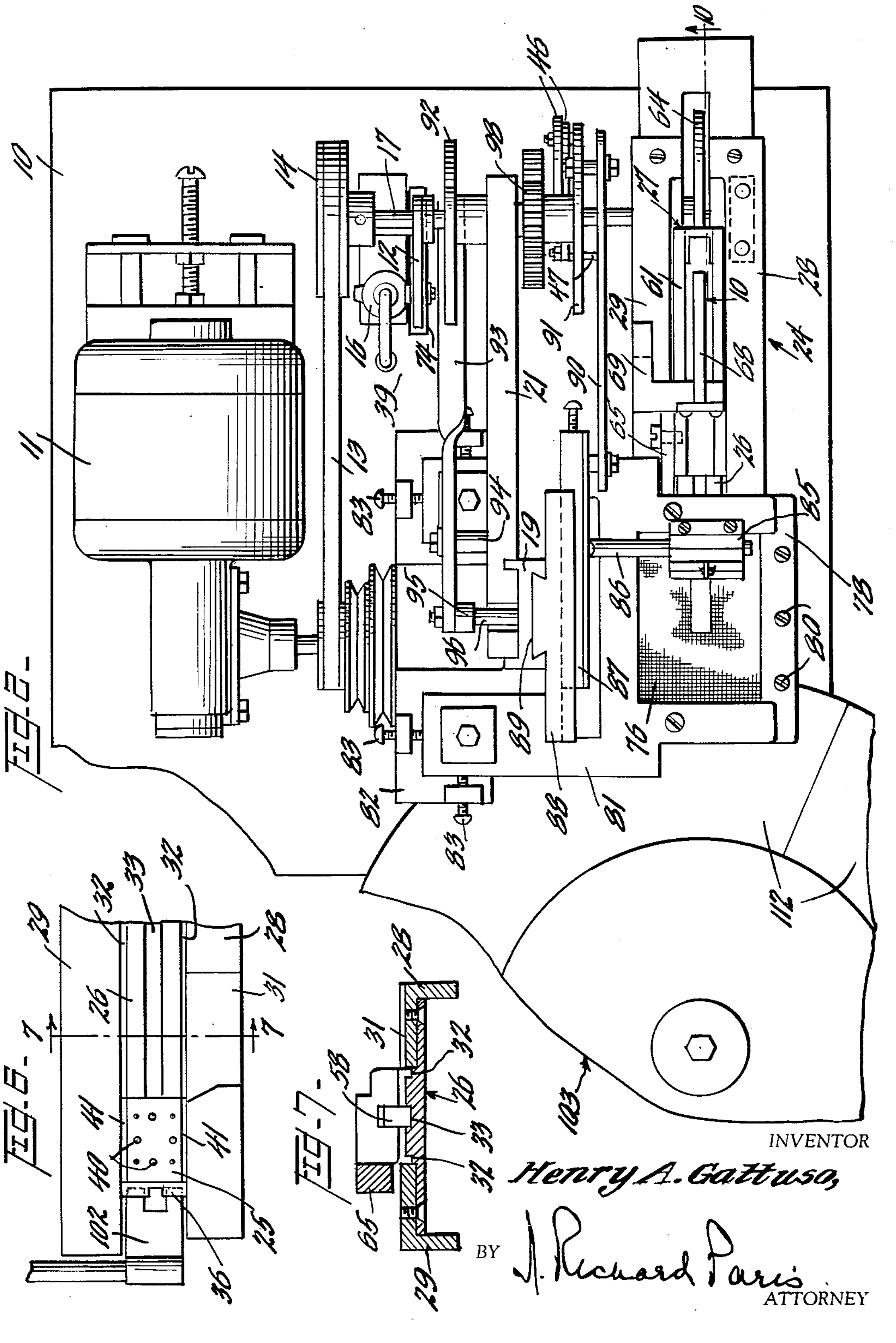
Fig. 2 is a plan view thereof.
Fig. 6 is a plan view of an end of the work table.
Fig. 7 is a transverse section on line 7—7 of Fig. 6.
Figures 3, 4, 5:
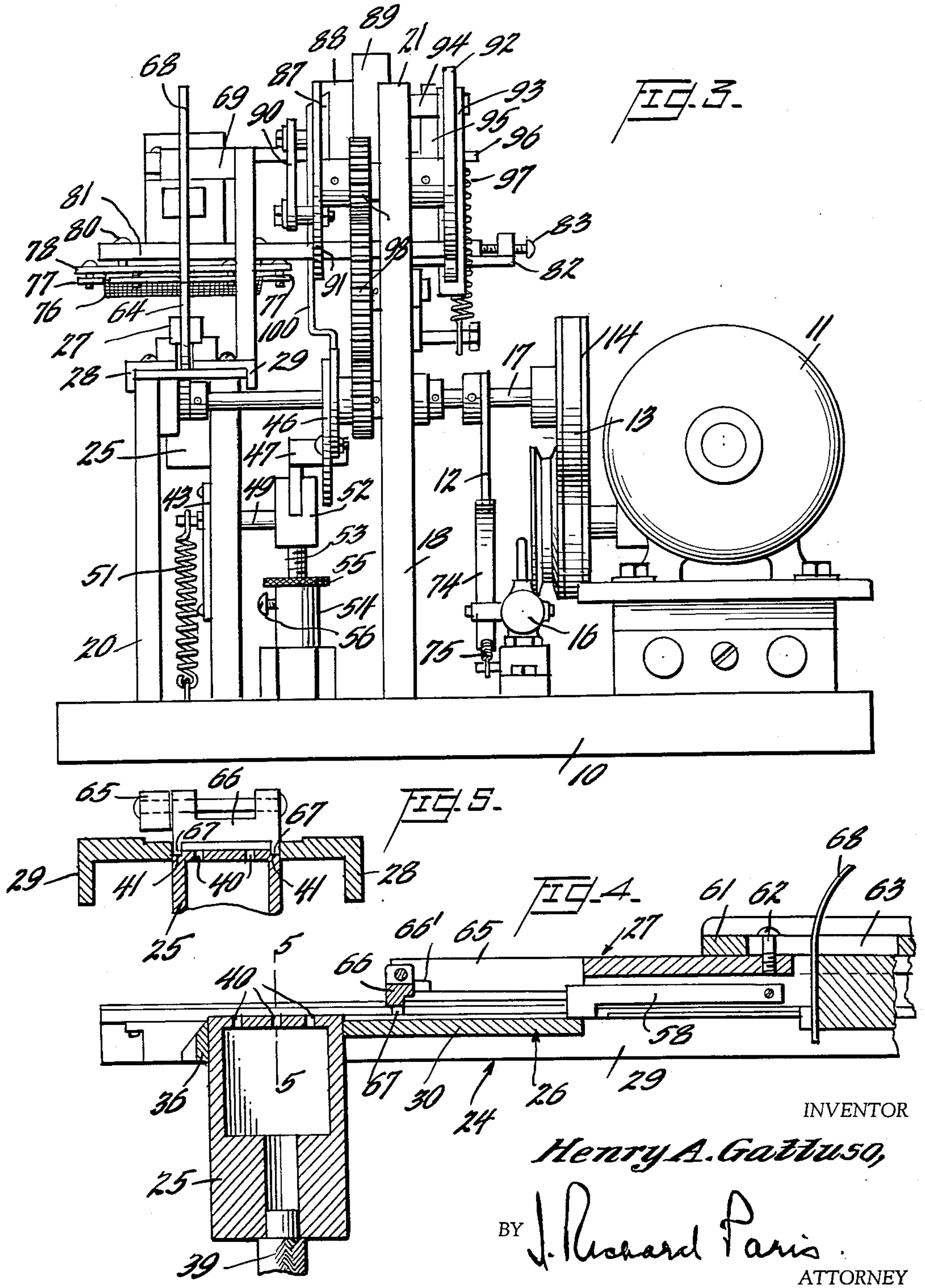
Fig. 3 is an end view thereof.
Fig. 4 is a partial longitudinal sectional view of the work table.
Fig. 5 is a transverse sectional view on line 5—5 of Fig. 4.
Figure 8:
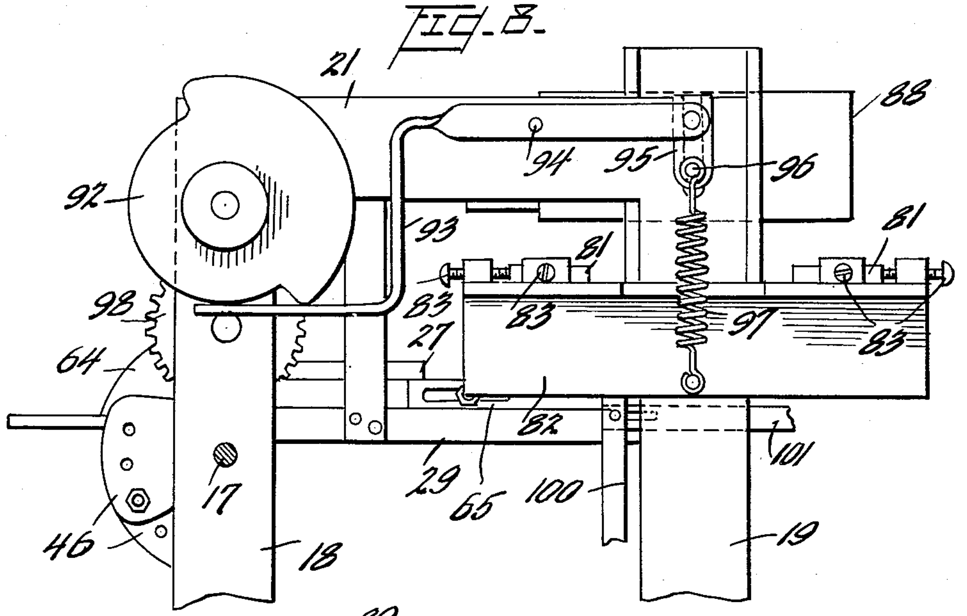
Fig. 8 is a rear elevation of the upper portion of the machine.
Figures 9, 10, 11:
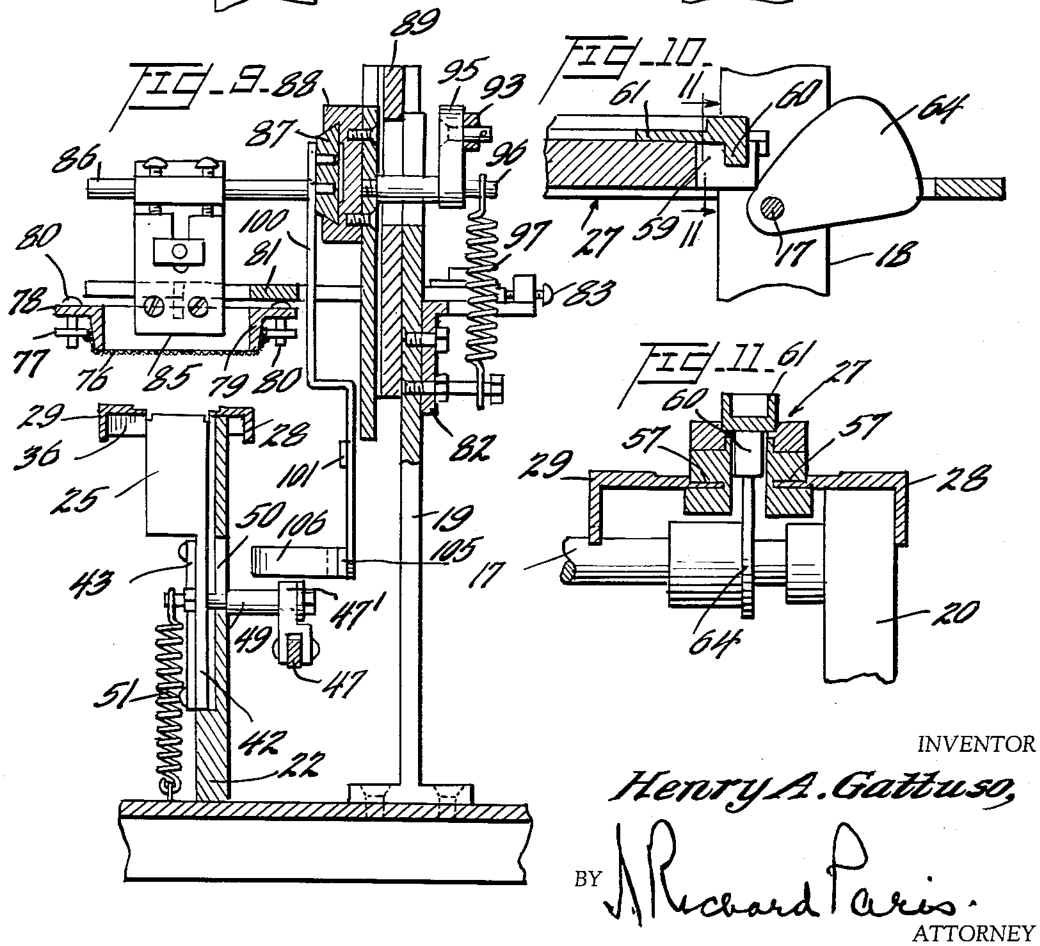
Fig. 9 is a vertical section on line 9—9 of Fig. 1.
Fig. 10 is a vertical section on line 10—10 of Fig. 2.
Fig. 11 is a section on line 11—11 of Fig. 10.

The present machine is particularly designed and constructed for printing with conductive ink or paste on small carrier elements. The printing may form resistances, inductances, or condenser elements or other circuits or parts of circuits. The carrier elements may be in the form of small mica sheets or ceramic or other elements. The specific embodiment shown herein is particularly suitable for operating on small mica sheets which are one inch by one and one quarter inches and several thousandths of an inch thick. The principle of operation of the present machine is applicable to other types of work for printing on other elements of a variety of sizes and compositions.

In its broad outlines, the present machine employs a fixed screen, a vertically reciprocating platen, a horizontally reciprocating spreader operating in the ink trough which carries the screen, and a horizontally reciprocating feed and discharge device. Suction is employed for holding the work on the platen during the travel of the platen and during the printing operation. Motor driven cams operate the several elements including a valve controlling the suction applied to the platen. Some of the elements are spring retracted.

The feed and discharge device is particularly designed for effective operation on the very thin mica elements employed in condenser elements. The device is also applicable for use with other work pieces.

The base plate 10 of the machine supports a motor 11 which transmits power by means of a belt 13 to the drive pulley 14 of the machine. A vacuum pump not shown herein is connected by conduit 15 to the valve 16 operable by cam 12. All of the operations of the machine are controlled and timed with relation to each other by means of cams or similar devices assisted by the suction as intermittently employed through the operation of the valve 16.

The rear uprights 18 and 19 are bridged by the cross bar 21. The front uprights 20 and 22 are bridged by the work table 24. The printing screen and spreader assemblies are carried by the rear upright 19.

The work table 24 is generally supported by the uprights 20, 22. It comprises a pair of parallel spaced strips or angle bars 28, 29 connected at one end by the cross member 36 and bridged in its intermediate portion by the work receiving plate 26. The bar 36 and plate 26 are spaced to receive the platen 25 and to permit for its vertical movement to and from the screen contacting printing position. The work feed and discharge carriage 27 is carried by the table as shown, the table serving as a guide for the repeated reciprocation of the carriage 27. If desired the plate 26 can be integral with the bars 28, 29. As shown the plate 26 is separable from the bars so as to permit for its replacement by a longer or shorter plate when the platen 25 is replaced by one of a different size. The plate 26 is mounted on the under side of bars 28, 29 and its intermediate portion 30 extends into the space between the bars and is coplanar with the recessed portion 31 of the bar 28. The portion 30 has a longitudinal shoulder 32 at each edge and a longitudinal groove 33 in its center. The small work elements are placed by the operator in the recessed portion 31 on the bar 28 and slid transversely until the leading edge of the work engages the bar 29.

The platen 25 is preferably in the form of a hollowed out metal block which receives the suction conduit 39 connected to the valve 16, the working face of the platen being provided with a series of openings 40 which lead into the interior of the block and therefore serve to hold the mica elements or other work pieces on the platen by suction. The face of the platen is provided with a longitudinal recess 41 along each edge. The platen is carried by the plate 42 which is lodged within a channel in the upright 22 and is held thereby the guide bars 43. The plate 42 reciprocates in the upright 22 between the retracted position in which the lower edge of the plate 42 rests against a shoulder in the lower portion of the upright 22 and the elevated position in which the platen 25 assumes the screen contacting and printing position.

In operation the platen is reciprocated between its retracted work-receiving position and its elevated screen contacting printing position. In its retracted position the upper face of the platen is flush with plate 26. Generally the elevated position of the platen is determined by the position of the screen and the thickness of the work, the vertical position of the screen being variable and adjustable. The present apparatus also embodies means which provide for a fine or micrometer adjustment of the elevated screen contacting printing position of the platen. This adjustment is designed for determining and controlling the contact pressure between the work and the screen thereby controlling the thickness of the ink or other coating material applied to the work by the printing operation.

For raising the platen, the cam 46, carried by the shaft 17 which is driven by the pulley 14, depresses the free end of the lever 47 which is pivotally mounted intermediate its ends at 48 and is connected at its other end to the platen 25 through the link 47′, rod 49 and plate 42 which is secured to the lower end of the platen. The rod 49 passes through an elongated vertical slot 50 in the upright 22. When the printing operation is completed and the cam 46 disengages the lever 47 the spring 51 retracts the platen to its lower or retracted position. The bifurcated stud 52 which supports the lever 47 is provided with a threaded shank 53 which enters a recess in the fixed stud 54. The interiorly threaded collar 55 serves as a stop for the shank 53 and the set screw 56 serves to hold the shank 53 and stud 52 in adjusted position. By rotating the collar 55, the stud 52 may be raised or lowered thereby also rasing or lowering the pivot point 48 of the lever 47.

This adjustment thereby determines the elevated position of the platen 25 and the contact pressure between it and the printing screen. With increased pressure the thickness of the coating is reduced and by decreased pressure the thickness of the coating is increased. The screen employed in the present apparatus is a high mesh stainless steel wire screen which is drawn tautly on its frame with the consequence that it presents a substantially rigid though somewhat resilient face to the platen. By means therefor of this control device the thickness of the coating is controlled and a high degree of reproducibility and uniformity of coating is obtained. This phase of the present invention is of particular importance when it is employed in printing resistances, whose value depends upon the thickness of the coating. By the present adjustment the first few specimens are measured and the collar 55 is rotated in one direction or another until the desired resistance value is had. The set screw 56 is now set and the machine is set for a large number of operations in which the resistance values will be substantially uniform.

The work feeding and discharging carriage 27 slides on the bars 28, 29 by the channels 57. The tongue 58 is loosely pivoted in a suitable groove in the underside of the carriage 27, extends forwardly from the carriage and its front end rests in groove 33 in plate 26. When the carriage is moved by the cam 64 the tongue 58 engages the edge of the work and pushes it on to the face of the platen 25. The rear portion of the carriage 27 is bifurcated as shown providing the elongated recess 59 which receives the downwardly directed tail 60 of the feed control 61, which is adjustably mounted in the channel on the upper face of the carriage 27 by the screw 62 passing through the elongated slot 63. The cam 64 carried by the shaft 17 works through the slot in the table 24 and engages the tail 60 of the feed control 61 to push the feed carriage to transfer the work, such as the mica sheet, from the feed plate to the platen. The feed control 61 is set in its adjusted position to correspond to the length of the work or to the desired feed stroke.

The ejector, which discharges the printed work from the face of the platen to make room for receiving the next mica sheet, comprises an arm 65 mounted on the rear face of the carriage 27 by a screw through an elongated slot in the arm 65 which permits for longitudinal adjustment. The forward end of the arm 65 has a transverse pintle which carries loosely thereon the discharge bar 66. The stop 66′ on the arm 65 stops the rearward swing of the bar 66 as the same is moved forward during the discharge and feeding movement, and the bar 66 assumes a substantially vertical position with its downwardly extending corners 67 entering the grooves 32 and 41 to engage the end of the mica sheet to discharge the same from the platen. On its return stroke, the ejector bar swings freely and rides lightly over the mica sheet held on the face of the platen by suction with only its corners 67 touching the work lightly.

The return stroke of the combined feeding and ejecting block 27 is effected by the spring 68 which is lodged at its upper end in the block 69 carried by bar 29. The lower end of the spring 68 is lodged in a suitable recess in the block 27 as shown and presses the carriage rearwardly.

The work, when in the form of small sheet-like elements, has to be retained on the platen against displacement. The present machine may be employed for printing on a variety of materials and the retaining means may be varied to suit the particular work materials. The present machine was particularly designed for printing on small thin mica sheets for the production of electrical capacitors. In order to hold these work elements on the platen the present machine employs a vacuum source (not shown) which is connected to the platen by conduit 15, valve 16, and conduit 39. The valve 16 is operated by the cam 12 carried by shaft 17 which depresses the valve operating arm 74. The cam is designed and mounted so that the valve is operated by the cam to its closed position during the ejection and feeding operation. Concurrently with the completion of the feeding operation the cam 12 disengages the arm 74, the return spring 75 returns the valve to open position and suction is supplied to the platen which serves to hold the work on the platen against the action of the ejector during the return stroke of the block 27. Suction is maintained as the platen is elevated, the printing operation completed and the platen is returned to its retracted position. At this point suction is removed and the ejection and feeding operation is repeated.

The screen 76 employed herein is a stainless steel wire screen of high mesh, 200 to 300 to the inch. The edges of the screen are soldered or welded to the bars 77 which are then drawn towards but not touching the flanges 78 of the frame 79 by the screws 80, thereby drawing the screen tautly across the outer face of the frame. By repeated heating and tautening the screen can be rendered so taut that it approximates rigidity while still resilient. The screen carries on its outer face a photographic negative reproduction of the material to be printed. The frame constitutes a trough for the ink or other printing or coating paste. The support 81 carries the frame 79 with its screen, and is mounted on the bar 82 which is adjustably attached to upright 19. The screws 83 which are carried by the bar 82 bear against the support 81 and provide for the fine adjustment of the position of the screen in relation to the platen.

The squeegee blade or spreader 85, which is reciprocated against the inner face of the screen wire to press the ink or other coating material through the free wire mesh, is adjustably mounted on rod 86, which is carried by the slide 87 which reciprocates in the channel 88. The channel 88 with the slide 87 reciprocates vertically in the channel 89 in upright 19. The horizontal reciprocation of slide 87 is effected by the pitman 90 carried by the disc 91 which is rotated by the gears 98 driven by shaft 17. The length of this movement of the slide 87 is determined by the adjustable mounting of the pitman 90 on the disc 91. The vertical reciprocation of the channel 88 is effected by the engagement of the cam 92 against the lever 93 which is pivotally mounted at 94 and is connected to the channel 88 by the link 95 and the rearwardly extending rod 96 which passes through a slot in the upright 19. The spring 97 retracts the spreader from its raised to its lowered position.

By the means described the spreader 85 presses against the screen and moves over the screen to force ink through the open mesh and is then elevated by the operation of cam 92, which is on the same shaft as disc 91, against lever 93. While still in elevated position the spreader is returned to its original or starting position and is then lowered for its next printing operation. The engagement of the spreader with the screen and its travel thereover is timed with the engagement of the platen and the work carried by the platen with the underface of the screen. The action of the spreader along a path formed by the sides of an oblong in the vertical plane operates to maintain an adequate supply of ink over the printing area in the trough and serves to carry away ink at each cycle from one end of the frame to the other.

The spreader carrier slide 87 has affixed thereto the dependent arm 100 which carries the forwardly extending arm 101 to which is attached the element 102 which has a downwardly inclined face which receives the discharged printed work elements and delivers them to the rotating table 103 or other suitable conveyor. The work transfer 102 executes the same movement as the squeegee.

During the printing operation, that is when the spreader travels in engagement with the screen, the work transfer device 102 moves toward the platen at a level below the level of the table 24. This movement is followed after an interval by an upward movement of the spreader and work transfer device 102, so that the latter reaches a position where its edge nearest the platen is only slightly below the face of the platen which by this time had reached its retracted position. The ejector then engages the rear edge of the work and pushes it off the face of the platen and onto the transfer or delivery device 102 and shortly after this the delivery device 102 receives the front edge of the work and recedes with the work during the return stroke of the spreader. During this travel the work slides from 102 onto table 103. When the work delivery device 102 reaches its position furthest from the platen, the arm 105, which is a forward extension of the dependent arm 100, engages and pushes arm 106 which moves the pawl 107 over the ratchet 108. When the squeegee commences its printing stroke, the arm 106 is released and its spring 110 moves it and the pawl to rotate the table 103 so as to bring the next portion of the table to receive the next printed work piece.

The table in the present embodiment is faced with a pair of arcuate semi-circular removable portions 112 so that they may be removed successively to deliver the work pieces for heat treatment or other further treatment.

Figures 12, 13, 14, 15, 16, 17:
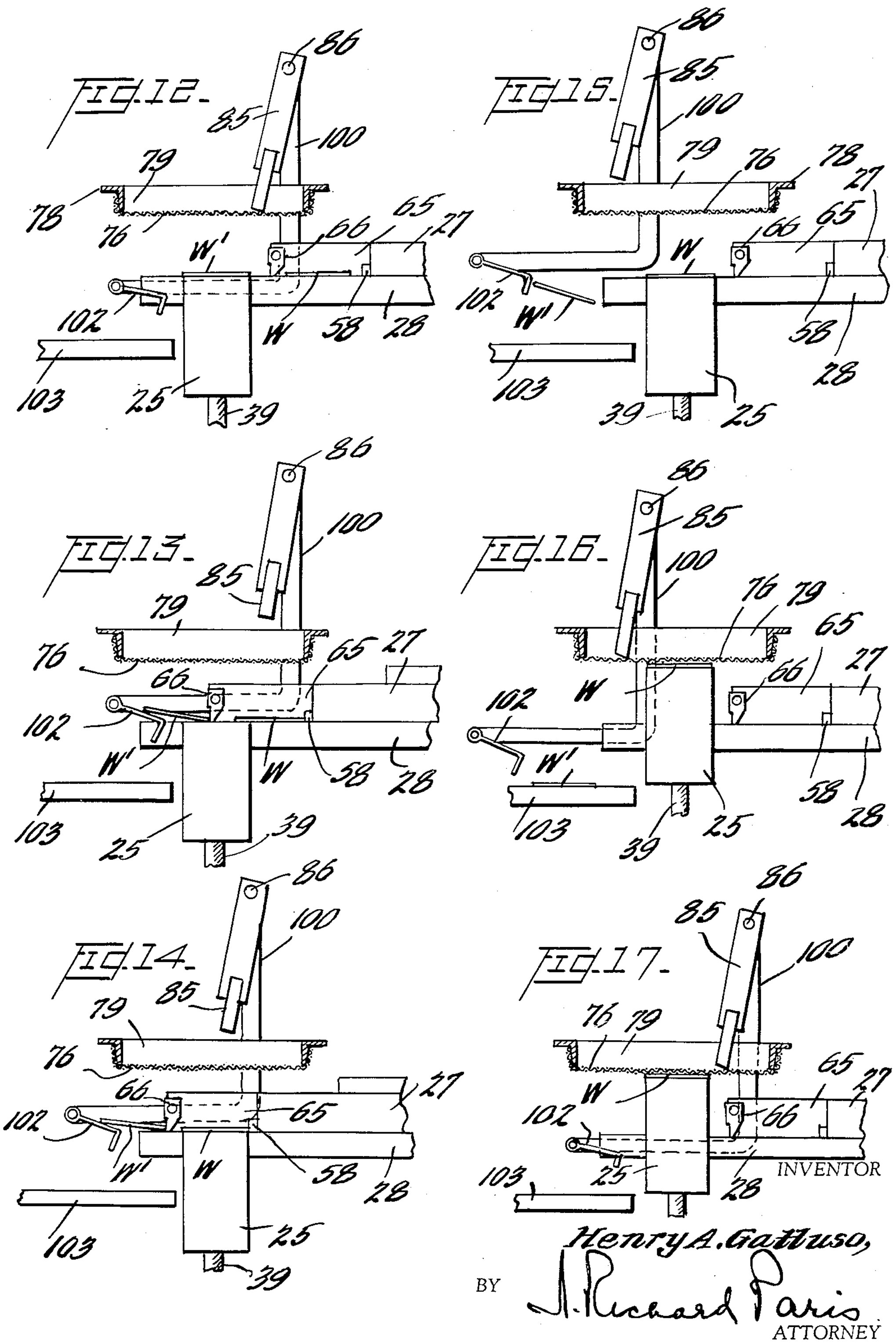
Fig. 12 is a schematic showing of the position of the parts at the commencement of the combined feeding, discharge and transfer operation.
Fig. 13 shows the initiation of the feed, discharge and transfer operation with the concomitant raising of the transfer and spreader device.
Fig. 14 shows the parts at the completion of the combined feed, and discharge operation with the printed work deposited on the transfer device and a fresh work piece deposited on the platen.
Fig. 15 shows the discharge and feed device retracted to the position of Fig. 8 with the spreader and transfer in their foremost positions and the printed work being deposited on the receiving table.
Fig. 16 shows the platen raised to screen contacting position and the spreader lowered to screen contacting position.
Fig. 17 shows the end of the printing operation.

The operation of the machine and the sequence of the positions assumed by the operating parts are illustrated in Figs. 12 to 17. Fig. 12 shows the position of the parts at the initiation of the feed and transfer stroke of the carriage 27. The work piece W has just been deposited manually on the work delivery plate 26, and a printed work piece W1 is on the platen ready to be discharged therefrom. The feed tongue 58 is preferably spaced somewhat rearwardly of the work. The cam 64 is about ready to engage the feed carriage and start it on its feeding operation, and the spreader is at the end of its printing stroke. The work delivery device 102 is in its low position nearest the platen. The suction is disconnected. From this position the engagement of cam 92 against the lever 93 moves the spreader and the work transfer finger 102 to their elevated position and the finger 102 is ready to receive the printed work piece W1. The cam 46 starts the feed and discharge operation at the same time. As shown in Fig. 13, the spreader and finger 102 are in raised position. The carriage 27 had moved forward and the work W1 now rests partly on the transfer finger 102.

From the position of Fig. 13 to the position in Fig. 14 the feed and discharge stroke is completed. The fresh work piece W is now lodged on the platen and the printed work piece W1 is supported by the fingers 102. The cam 12 has disengaged the valve arm, the valve is moved to its open position by its spring thus providing suction to the platen and holding the work firmly on the platen. At the same time the spreader 85 and the transfer fingers 102 had moved partly forward.

Fig. 15 shows the spreader 85 and its associated parts moved forward to the end of its idle stroke. The arm 105 moves with the spreader to press arm 106 to move pawl 107 against the spring 110 thereby setting it for the advancement of table 103 during the printing stroke of the spreader. At the same time the feed carriage 27 was retracted to its rearward position by the spring 68, the cam 64 having disengaged the carriage.

When the condition shown in Fig. 15 is reached, cam 92 disengages arm 93 and spring 97 retracts the spreader and its associated parts to their lowermost positions as shown in Fig. 16. This operation causes the work W1 to slide off fingers 102 and onto table 103. The contact of metal fingers 102 also removes any electric charge that may have formed on the work during the printing operation.

During the interim between the positions of Figs. 15 and 16 the platen 25 is raised to press the work W against the screen by the engagement of cam 46 with lever 47, the rotary cam operating to maintain the lever 47 fully depressed through the printing stroke of the spreader.

Fig. 17 shows the completion of the printing stroke of the spreader with the consequent withdrawal of the arm 105 from engagement with arm 106 and the pawl is now acted on by the spring causing it to engage the ratchet and advance the table 103.

After the printing is completed cam 46 disengages lever 47 and spring 51 retracts the platen, and cam 12 shuts off valve 15 to remove suction from the platen and the apparatus is thus returned to the position shown in Fig. 12, and the cycle of operation is resumed as the operator feeds a work piece to the table 26.

This application is a continuation in part of Serial No. 259,159 filed Nov. 30, 1951, now Patent 2,702,001.

I claim:

1. A stencil printing machine comprising a holder for a stencil, a work holder reciprocally mounted for moving work placed thereon into and out of contact with the stencil, a spreader mounted for movement parallel with the plane of the stencil and transversely to the plane thereof, means for moving the work holder to and away from the stencil, means for adjusting the stroke of the work holder to vary the contact pressure between the work and the stencil, means for adjusting the period of contact between the work and the stencil, means for reciprocating the spreader parallel with the stencil, including means for adjusting the length of stroke and speed of travel, means for raising the spreader from the stencil, means for positively and resiliently urging the spreader against the stencil, said spreader reciprocating means and raising means being keyed to raise said spreader at the end of a spreader stroke in one direction of reciprocation, and to permit lowering of said spreader by said resilient means at the end of a spreader stroke in the other direction of reciprocation, said work holder moving means being keyed to said spreader reciprocating means to bring a work into stencil contact during spreader stroke in the first of said directions, and to remove the work away from the stencil during spreader stroke in the second of said directions.

2. A work registering device comprising an elongated work guide, a work holder adjacent one end of said guide, means for clamping work positioned on said holder, a work driver mounted for reciprocation along said guide, carrying a first impeller for advancing work positioned on said guide to said holder, and a second impeller forward of said first impeller for advancing work positioned on said holder, said second impeller being positioned forward of said first impeller a distance greater than the span of said holder, means for reciprocating said driver along said guide from a starting position substantially adjacent the other end of said guide to cause at once said first impeller to position work on said holder and said second impeller to remove a previous work from said holder and said driver to return to starting position, said second impeller being yieldable on driver return to pass over work positioned on said holder, means for moving said holder between a work receiving position in substantial alignment with said guide and a work operating position, and means for keying said driver reciprocating means and said holder moving means to that the driver is clear of said holder on its return stroke before the latter is moved to work operating position.

3. A work registering device comprising an elongated work guide, a work holder adjacent one end of said guide, a work driver mounted for reciprocation along said guide, comprising a first impeller for advancing work positioned on said guide to said holder, and a second impeller forward of said first impeller for advancing work positioned on said holder, said second impeller being positioned forward of said first impeller a distance greater than the span of said holder, means for reciprocating said driver along said guide from a starting position substantially adjacent the other end of said guide to cause at once said first impeller to position work on said holder and said second impeller to remove a previous work from said holder and said driver to return to starting position, said second impeller being yieldable on driver return to pass over work positioned on said holder, means for moving said holder between a work receiving position in substantial alignment with said guide and a work operating position, and means for keying said driver reciprocating means and said holder moving means so that the driver is clear of said holder on its return stroke before the latter is moved to work operating position.

4. A work registering device comprising an elongated work guide, a work holder adjacent one end of said guide, a first impeller reciprocally mounted on said guide for advancing work positioned on said guide to said holder, a second impeller reciprocally mounted on said guide forward of said first impeller for advancing work positioned on said holder, said second impeller being positioned forward of said first impeller a distance greater than the span of said holder, means for reciprocating said impellers along said guide from a starting position to cause at once said first impeller to position work on said holder and said second impeller to remove a previous work from said holder and said impellers to return to starting position, means for moving said holder between a work receiving position in substantial alignment with said guide and a work operating position, and means for keying said impeller reciprocating means and said holder moving means so that the driver is clear of said holder on its return stroke before the latter is moved to work operating position.

5. A stencil printing machine comprising a holder for carrying a stencil, a spreader therefor, means for effecting relative reciprocation therebetween, a work holder, means for clamping work positioned on said holder, means for reciprocating the work holder between a work receiving position and a work printing position in printing contact with said stencil, a work registering device including a work guide in substantial alignment with said holder when in work receiving position, and a work driver reciprocally mounted on said guide, said driver having a first impeller for advancing work to said holder, and a second impeller forward of said first impeller for advancing work from said holder, means for reciprocating said driver from a starting position along said guide to cause at once a work placed on said guide to be positioned on said holder by said first impeller and a previous work to be removed from said holder by said second impeller and to bring said driver back to starting position, and means for keying said driver reciprocation cycle and the printing cycle to cause a substantially complete driver cycle before each printing cycle, said second impeller being yieldable on driver return to pass over work positioned on said holder.

6. A stencil printing machine comprising a holder for carrying a stencil, a spreader therefor, means for effecting relative reciprocation therebetween, a work holder, means for reciprocating the work holder between a work receiving position and a work printing position in printing contact with said stencil, a work registering device including a work guide in substantial alignment with said holder when in work receiving position, and a work driver reciprocally mounted on said guide, said driver having a first impeller for advancing work to said holder, and a second impeller forward of said first impeller for advancing work from said holder, means for reciprocating said driver from a starting position along said guide to cause at once a work placed on said guide to be positioned on said holder by said first impeller and a previous work to be removed from said holder by said second impeller and to bring said driver back to starting position, and means for keying said driver reciprocation cycle and the printing cycle to cause a substantially complete driver cycle before each printing cycle, said second impeller being yieldable on driver return to pass over work positioned on said holder.

7. A stencil printing machine comprising a holder for carrying a stencil, a spreader therefor, means for effecting relative reciprocation therebetween, a work holder, means for reciprocating the work holder between a work receiving position and a work printing position in printing contact with said stencil, a work registering device including a work guide in substantial alignment with said holder when in work receiving position, a first work impeller reciprocally mounted on said guide for advancing work to said holder, a second work impeller reciprocally mounted on said guide forward of said first impeller for advancing work from said holder, means for reciprocating said imepllers from a starting position along said guide to cause at once a work placed on said guide to be positioned on said holder by said first impeller and a previous work to be removed from said holder by said second impeller and to bring said impellers back to starting position, and means for keying said impeller reciprocation cycle and the printing cycle to cause a substantially complete impeller cycle before each printing cycle.

8. A device as set forth in claim 2, the guide having a first groove, the first impeller having a tongue adapted to ride in said groove for engaging the edge of a work in advancing it to the holder, the guide having a second groove, the holder having a groove in alignment with said second groove when in work receiving position, the second impeller having a tongue adapted to ride in said last mentioned two grooves for engaging the edge of a work in advancing it from the holder.

References Cited in the file of this patent

UNITED STATES PATENTS

| | | |
|---|---|---|
| 155,879 | McDonald | Oct. 13, 1874 |
| 912,889 | Ray | Feb. 16, 1909 |
| 1,110,810 | McDonald | Sept. 15, 1914 |
| 1,922,710 | Owens | Aug. 15, 1933 |
| 2,124,011 | Smith | July 19, 1938 |
| 2,201,924 | Schmitt | May 21, 1940 |
| 2,218,451 | Heyne | Oct. 15, 1940 |
| 2,229,346 | Shurley | Jan. 21, 1941 |
| 2,344,345 | Elliott | Mar. 14, 1944 |
| 2,578,779 | Black | Dec. 18, 1951 |
| 2,588,620 | Dubuit | Mar. 11, 1952 |
| 2,605,700 | Martin | Aug. 5, 1952 |
| 2,629,321 | Gattuso | Feb. 24, 1953 |
| 2,702,001 | Gattuso | Feb. 15, 1955 |